Nov. 10, 1936.　　　W. W. WARNER　　　2,060,649
REFRIGERANT COMPRESSOR
Filed Dec. 10, 1935
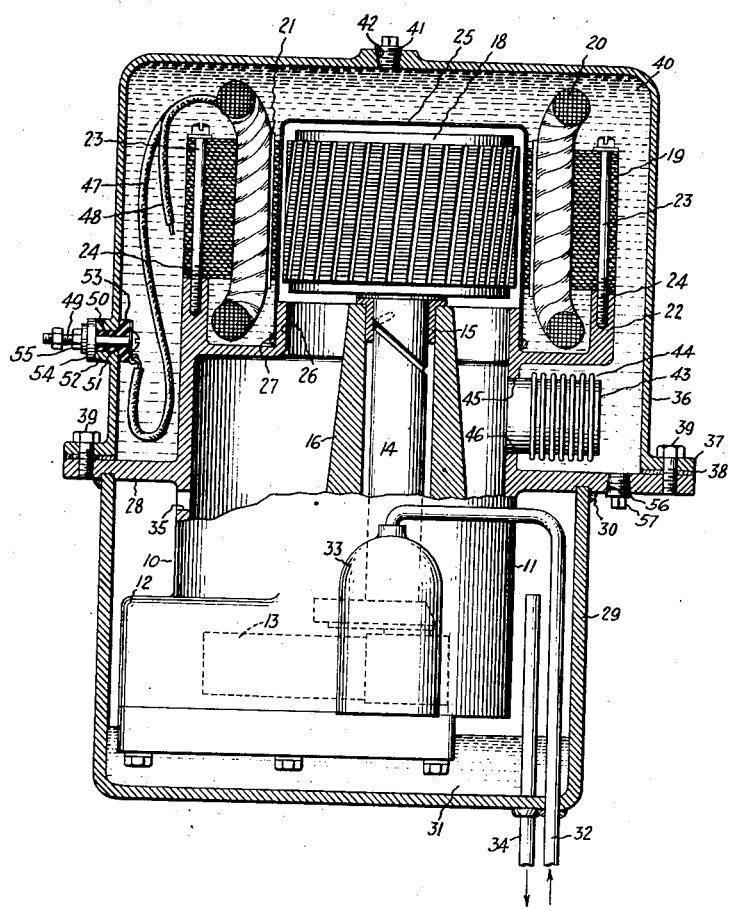
Inventor:
Wilbur W. Warner:
by Harry E. Dunham
His Attorney.

Patented Nov. 10, 1936

2,060,649

UNITED STATES PATENT OFFICE 2,060,649

REFRIGERANT COMPRESSOR

Wilbur W. Warner, Fort Wayne, Ind., assignor to General Electric Company, a corporation of New York Application December 10, 1935, Serial No. 53,733

3 Claims. (Cl. 230—58)

My invention relates to refrigerant compressors and more particularly to an arrangement for preventing the escape of vaporized refrigerant therefrom.

Refrigerant compressors are ordinarily driven by an electric motor or the like, and it is necessary to arrange the connection between the electric motor and the compressor shaft, so as to avoid leakage of refrigerant from the compressor casing. This may be accomplished by extending the compressor shaft through an opening in the casing and utilizing a shaft seal to prevent the escape of refrigerant, or the motor and compressor may be arranged within a hermetically sealed casing so that any refrigerant escaping from the compressor will be confined in the sealed casing. When a sealed casing is employed, however, special precautions must be taken in choosing the insulation for the energizing windings of the electric motor since the insulation must not be subject to deterioration when exposed to the refrigerant used.

In addition, many types of electrical insulation made from organic materials such as cotton or paper contain moisture in their ordinary forms. Even when the insulation has been dried in accordance with the ordinary practices used in manufacturing electric motors, some moisture will remain entrapped in the insulation. In accordance with the best present day manufacturing practice, special drying processes may be used prior to charging the machine with refrigerant by means of which enough of the moisture is removed that any remaining will not seriously affect the operation of the machine. Such drying processes are, however, expensive and add materially to the cost of the finished machine. They have been necessary heretofore, however, since if a substantial amount of moisture remains in the insulation it will have a deleterious effect on the machine. For example, if such a refrigerant as sulphur dioxide is used, the moisture remaining in the motor insulation will react with the sulphur dioxide to form sulphuric acid, which in turn attacks the metal parts of the machine. On the other hand, if a refrigerant such as dichlorifluoromethane is used, which does not have a chemical reaction with water at ordinary pressures and temperatures, the moisture may be carried along with the refrigerant through the system and will collect in the form of ice in the colder parts thereof, thus obstructing the free flow of refrigerant and in some cases even rendering the machine inoperative.

The difficulties caused by the presence of moisture referred to above, may be obviated by locating the stator of the electric motor outside the hermetically sealed casing while the motor rotor and compressor are located therein. When such an arrangement is utilized all of the motor energizing windings having insulation thereon are mounted on the stator. Since the windings, if any, in the motor rotor may be of the uninsulated type, the refrigerant vapor will not come in contact with any electrical insulation containing moisture. In such an arrangement, the portion of the casing which extends between the adjacent surfaces of the motor stator and rotor must be extremely thin, however, and also substantially non-magnetic, in order to avoid an undue decrease in the efficiency of operation of the motor. Such a thin walled diaphragm, when used as a portion of the sealing casing, presents special structural difficulties in that it must be extremely thin for the reasons indicated and yet must withstand substantial, as well as varying, pressures on the inner surface thereof due to the refrigerant vapor to which it is exposed.

It is an object of my invention to provide a refrigerating apparatus including a refrigerant compressor and a driving motor therefor including a diaphragm arranged to separate the rotor and stator of the electric motor and an arrangement for equalizing the pressures to which the diaphragm is subjected on its opposite sides during the operation of the refrigerant compressor, thus minimizing the mechanical strains imposed on the diaphragm.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which the single figure is a side elevation, partly in section, of a refrigerant compressor and an electric driving motor therefor embodying my invention.

Referring to the drawing, I have shown a refrigerant compressor unit designed for household use. This unit includes a refrigerant compressor 10 including a vertical, substantially cylindrical, compressor casing 11. The compressor cylinder is formed by an extension 12 provided on the lower side of the compressor casing 11 in which a suitable piston 13 is reciprocated by a vertical drive shaft 14. The upper end of the drive shaft 14 is journalled in a sleeve bearing 15, which is supported in the upper end of a vertical tubular extension 16 formed on the compressor casing 11.

The drive shaft 14 is rotated by an electric driving motor, which is preferably of the induction type, including a squirrel-cage type rotor 18 which is mounted on the upper end of the drive shaft 14. The rotor 18 is surrounded by a motor stator 19 provided with insulated energizing windings 20. The energizing windings 20 are mounted in suitable slots formed in the stator 19 and are retained in position therein by wedges 21. The stator 19 is secured to an upwardly extending substantially cylindrical peripheral flange 22 formed on the compressor casing 11 by a series of bolts 23. The lower ends of the bolts 23 are threaded in tapped holes 24 formed in the upper edge of the flange 22.

The adjacent portions of the stator 19 and rotor 18 are separated by an inverted cup-shaped diaphragm 25. The diaphragm 25 is substantially cylindrical and the lower portion thereof closely surrounds an upwardly extending substantially cylindrical flange 26 formed on the top of the compressor casing 11, thus frictionally engaging the same. The lower edge of the diaphragm 25 is welded to the base of the flange 26 as indicated at 27, thus hermetically sealing the adjacent portions of the diaphragm 25 and flange 26. The walls of the diaphragm 25 extending between the adjacent surfaces of the motor stator 19 and rotor 18 must be very thin since the air gap between the rotor and stator should be minimized in order to increase the efficiency of operation of the electric motor. Also, the diaphragm 25 must be made of a substantially non-magnetic material in order that the magnetic coupling between the rotor 18 and stator 19 will not be affected. In the particular construction shown, I prefer to form the diaphragm 25 from a sheet of metal approximately .005 inches in thickness and made of an alloy of approximately 80% by weight of nickel and 20% by weight of chromium.

The compressor casing 11 is provided with a flat laterally projecting annular flange 28 which extends entirely about the side walls thereof. The upper edge of a cup-shaped substantially cylindrical casing 29 is welded to the lower side of the flange 28 as indicated at 30. The casing 29 forms a lubricant reservoir below the compressor 10 in which a body of lubricant 31 is maintained for lubricating the moving parts of the compressor.

In the operation of the machine described above, vaporized refrigerant, such as sulphur dioxide, is supplied to the compressor 10 through a conduit 32 and intake muffler 33. The vaporized refrigerant thus supplied to the compressor 10 is compressed therein by the reciprocating piston 13 and is discharged through a suitable exhaust port into the interior of the casing 29. The compressed vaporized refrigerant thus discharged into the casing 29 passes therefrom through a conduit 34, the upper end of which is located above the level of the lubricant 31. The compressed refrigerant passes through the conduit 34 to a suitable refrigerating apparatus, which ordinarily includes a condenser and evaporator. The compressed vaporized refrigerant is liquefied by the transfer of heat therefrom to a surrounding cooling medium in the condenser and the refrigerant thus liquefied is then supplied to the evaporator. The liquid refrigerant in the evaporator is then vaporized by the absorption of heat from a compartment or the like to be cooled in which the evaporator is located. The refrigerant thus vaporized is then returned to the compressor 10 through the conduit 32 and the cycle is repeated and continued during operation of the refrigerating machine.

It will be noted that an aperture 35 is provided in the compressor casing 11, thus affording communication between the interior of the diaphragm 25 and the casing 29. Also, some vaporized refrigerant may escape from the compressor casing 11 along the shaft 14 into the interior of the diaphragm 25. Consequently, the interior surface of the diaphragm 25 is subjected to the pressure of the compressed vaporized refrigerant discharged from the compressor 10. It will be apparent that the pressure to which the interior of the diaphragm 25 is exposed will vary within comparatively wide limits since it will be at a maximum when the compressor 10 is in operation, thus supplying compressed vaporized refrigerant to the interior of the diaphragm, and at a minimum when the compressor 10 has been stopped.

I have provided an arrangement for equalizing the pressures to which the inner and outer surfaces of the diaphragm 25 are subjected which is effective in operation at all times irrespective of the variations in pressure caused by the stopping and starting of the compressor 10. As shown in the drawing, an inverted cup-shaped substantially cylindrical enclosing casing 36 extends entirely about the compressor driving motor and the upper portion of the compressor casing 11. The lower edge of the enclosing casing 36 is provided with a laterally extending peripheral flange 37 which extends entirely about the same. A gasket 38 is interposed between the adjacent surfaces of the flanges 28 and 37 formed on the compressor casing 11 and enclosing casing 36 respectively, to provide a sealed chamber about the stator 19. A series of screws 39 pass through holes formed in the flange 37 and are threaded in registering tapped holes formed in the flange 28. The adjacent portions of the enclosing casing 36 and compressor casing 11 are thus sealed against the leakage of fluid therebetween. The enclosing casing 36 is filled with a substantially incompressible fluid, such as lubricating oil 40, through a filling plug 41 threaded in an aperture 42 formed in the top wall thereof.

I have provided a resilient movable member or wall exposed on its opposite sides to the compressed vaporized refrigerant within the compressor casing 10 and the incompressible fluid 40 in the enclosing casing 36 for equalizing the pressures to which the diaphragm 25 is subjected on its opposite sides. The resilient movable member shown is a substantially cylindrical bellows 43 having annular corrugations 44 extending thereabout. The outer end of the bellows 43 is closed and the interior thereof communicates through the open inner end thereof with the interior of the compressor casing 11. The bellows 43 is preferably made of a flexible metallic material such as sheet copper and the inner end 45 thereof is brazed or otherwise hermetically sealed to the adjacent edges of the hole 46 formed in the side wall of the compressor casing 11.

When the compressed vaporized refrigerant is discharged by the compressor 10 into the interior of the compressor casing 11 during the operation thereof, the pressure on the inner surface of the diaphragm 25 is increased, as was pointed out above. At the same time, however, the pressure on the interior surface of the bellows 43 is also increased and tends to expand the same. Consequently, this pressure is transmitted by the bellows 43 to the incompressible fluid 40 in the enclosed casing 36. Since all confined incompressible fluids transmit any pressure applied thereto without diminution to all of the surfaces confining the same, the pressure exerted by the bellows 43 is transmitted through the fluid 40 to the exterior surface of the diaphragm 25. Conversely, if the pressure of the vaporized refrigerant within the compressor casing 11 is decreased, the pressure on the interior surface of the diaphragm 25 will also be decreased. At the same time, however, the pressure transmitted from the bellows 43 to the exterior surface of the diaphragm 25 will also be decreased by the same amount. It should be also understood that during the operation of the electric driving motor the energizing windings 20 will be supplied with electric current and consequently the windings 20 will be heated due to the passage of electric current therethrough. Some of this heat will be transferred to the fluid 40 surrounding the windings 20 which will in turn cause the fluid 40 to expand and increase the pressure exerted thereby on the exterior surface of the diaphragm 25. The pressure to which the bellows 43 is subjected will, however, also be increased by the same amount. This increase in pressure on the bellows 43 will cause the same to be partially collapsed, thus affording increased space for the expansion of the liquid 40 until the pressures on the opposite sides of the bellows 43 are exactly balanced. Consequently, the pressures to which the exterior and interior surfaces of the diaphragm 25 are subjected are always exactly equalized irrespective of the variations in pressure in either the compressed vaporized refrigerant on the interior of the diaphragm or the variations in pressure in the fluid 40 on the exterior of the diaphragm 25.

The energizing windings 20 are supplied with current through insulated electrical conductors 47 and 48, each connected to a suitable terminal of the same construction. The outer end of the conductor 47, for example, is secured to a conducting screw 49, which is mounted in an insulating bushing 50. The bushing 50 is mounted in a bore 51 formed in a boss 52 provided on the side of the enclosing casing 36. The inner end of the bushing 50 is provided with a flange 53 which abuts against the inner surface of the enclosing casing 36. An insulated sealing washer 54 is pressed against the outer end of the extension 52 by lock-nut 55 threaded on the screw 49. A tight seal is thus provided at the bore 51 through which the conducting screw 49 passes.

The enclosing casing 36 may be readily removed in order to repair or inspect the stator 19 of the electric motor and its energizing windings 20 without the loss of refrigerant from the machine. In carrying out this operation, the fluid 40 is drained from the interior of the enclosing casing 36 through a hole 56 formed in the flange 28 which is normally closed by a threaded drain plug 57. The screws 39 are then removed, thus freeing the lower edge of the enclosing casing 36 and the latter may then be readily removed from the diaphragm 25.

While I have shown a particular embodiment of my invention in connection with a refrigerant compressor designed for household use, I do not desire my invention to be limited to the particular construction shown and described and I intend in the appended claims to cover all modifications within the spirit and scope of my invention.

What I claim as new and desire to secure by Letters Patent of the United States is:

1. In combination, a compressor for compressing vaporized refrigerant passing therethrough including a compressor casing and a drive shaft, an electric driving motor for said compressor provided with a stator and a rotor, means for mounting said rotor on said drive shaft, means including a thin walled diaphragm extending between said rotor and said stator and cooperating with said compressor casing for preventing the leakage of vaporized refrigerant therefrom, the interior of said diaphragm being exposed to the vaporized refrigerant contained therein, an enclosing sealed casing extending about said stator, said enclosing casing being filled with an incompressible fluid to which the exterior of said diaphragm is exposed, and means including a resilient compressible bellows exposed on its opposite sides to the vaporized refrigerant and to the incompressible fluid for equalizing the pressures applied to the interior and exterior of said diaphragm.

2. In combination, a compressor for compressing vaporizd refrigerant passing therethrough including a compressor casing and a drive shaft, said compressor casing containing compressed vaporized refrigerant discharged from said compressor, an electric driving motor for said compressor provided with a stator and a rotor, means for mounting said rotor on said drive shaft, means including a thin walled diaphragm extending between said rotor and said stator and cooperating with said compressor casing for preventing the leakage of compressed vaporized refrigerant therefrom, the interior of said diaphragm being exposed to the compressed vaporized refrigerant discharged from said compressor, an enclosing casing extending about said stator, said enclosing casing being filled with an incompressible fluid to which the exterior of said diaphragm is exposed, and means including a resilient wall exposed on its opposite sides to the compressed vaporized refrigerant and to the incompressible fluid for equalizing the pressures applied to the interior and exterior of said diaphragm.

3. In combination, a compressor for compressing vaporized refrigerant passing therethrough including a compressor casing and a vertical drive shaft, an electric driving motor for said compressor provided with a stator and a rotor, means for mounting said rotor on said drive shaft, means including a thin walled inverted cup-shaped diaphragm extending between said rotor and said stator and cooperating with said compressor casing for preventing the leakage of vaporized refrigerant therefrom, the interior of said diaphragm being exposed to the vaporized refrigerant therein, said compressor casing having a horizontal portion extending thereabout, an inverted cup-shaped enclosing sealed casing extending about said stator and having the lower edges thereof arranged in contacting relation with said horizontal portion of said compressor casing, said enclosing casing being filled with an incompressible fluid to which the exterior of said incompressible fluid is exposed, and means including a resilient movable member exposed on its opposite sides to the vaporized refrigerant and to the incompressible fluid for equalizing the pressures applied to the interior and exterior of said diaphragm.

WILBUR W. WARNER.